F. M. PETERS.
WAFER CUTTING MACHINE.
APPLICATION FILED NOV. 6, 1905.
908,322.
Patented Dec. 29, 1908.
6 SHEETS—SHEET 5.
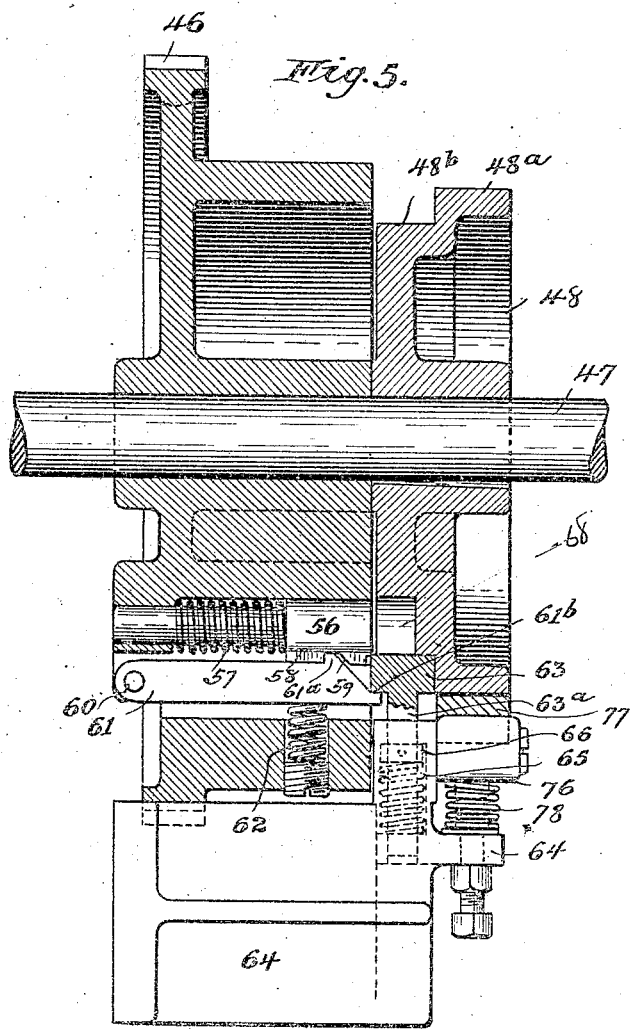
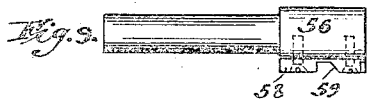

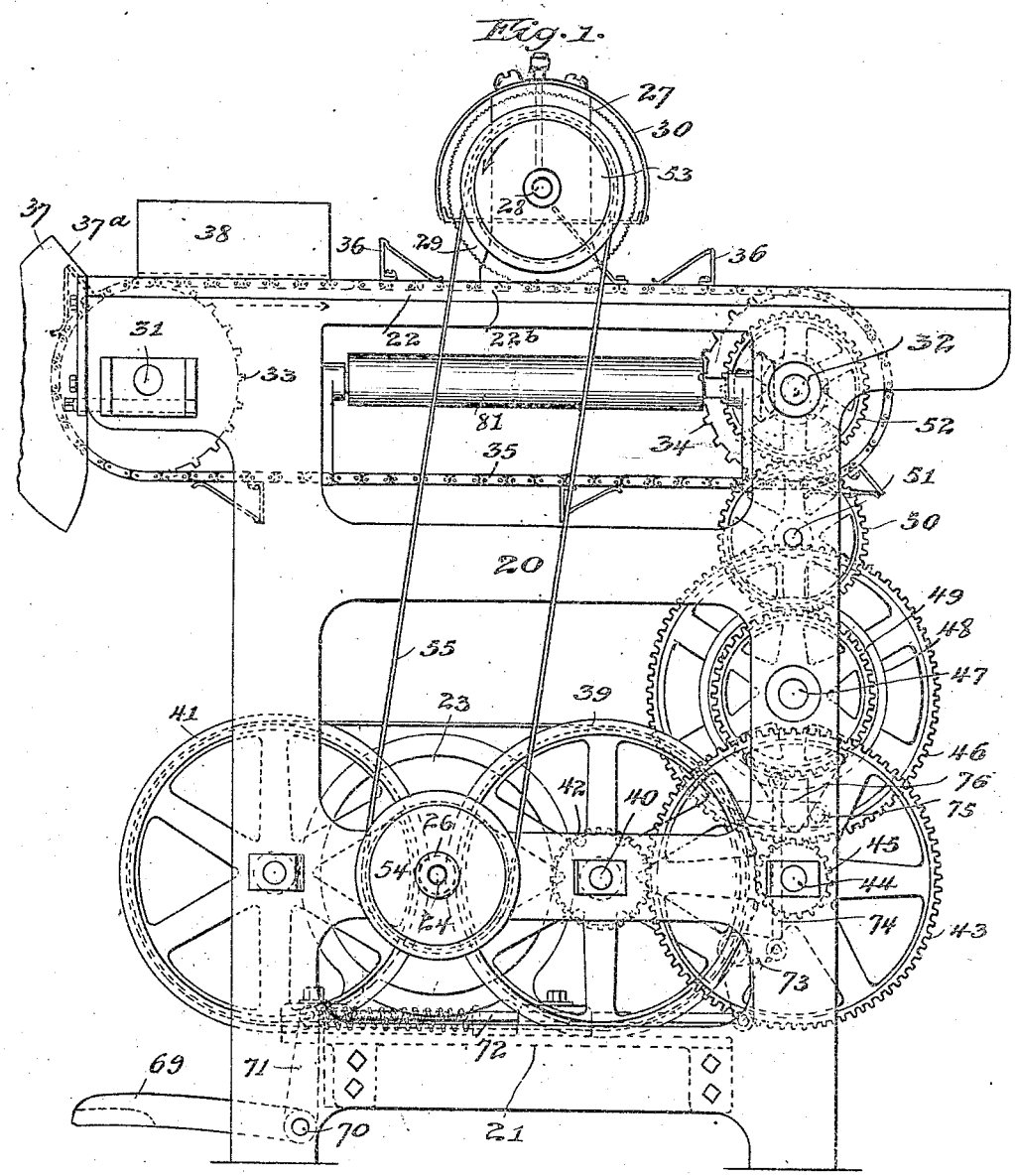

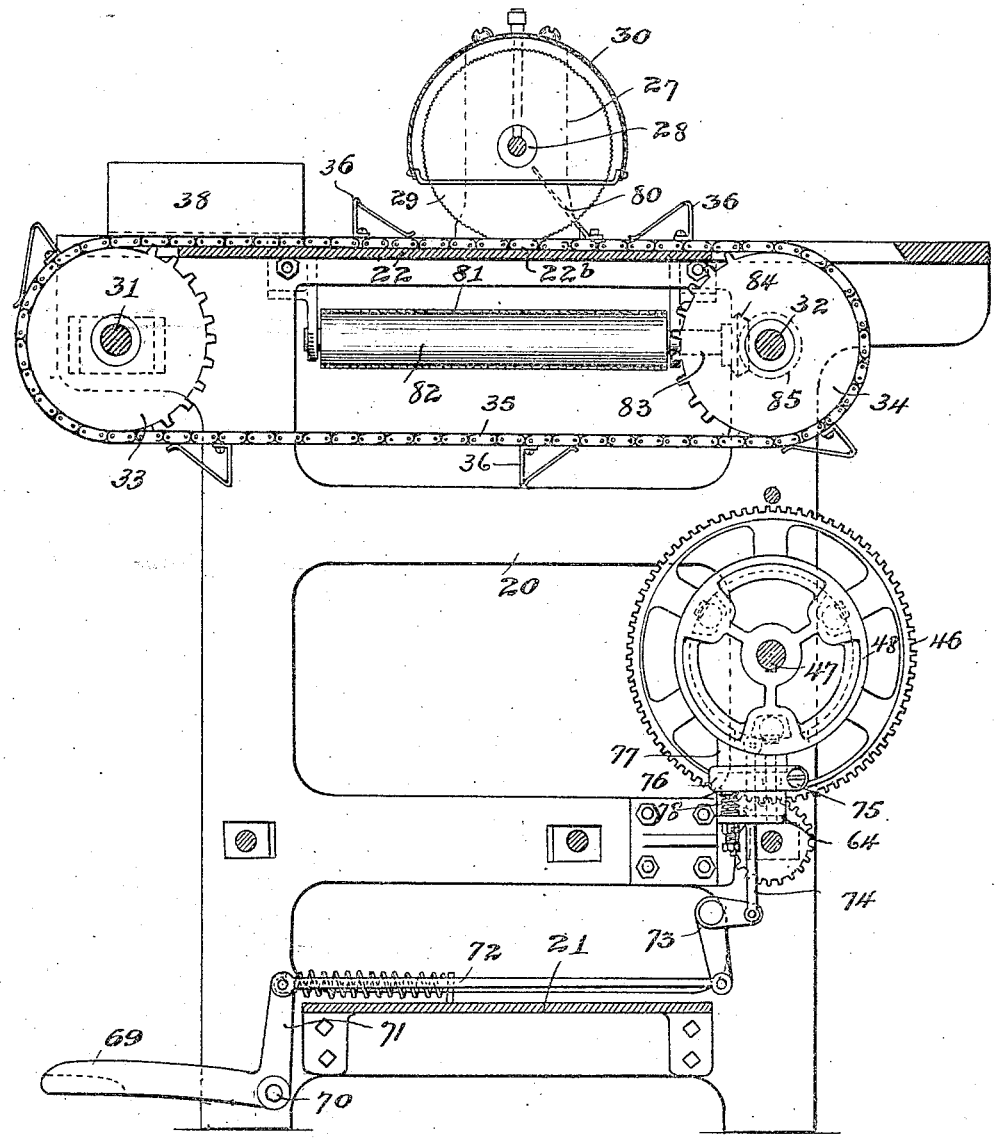

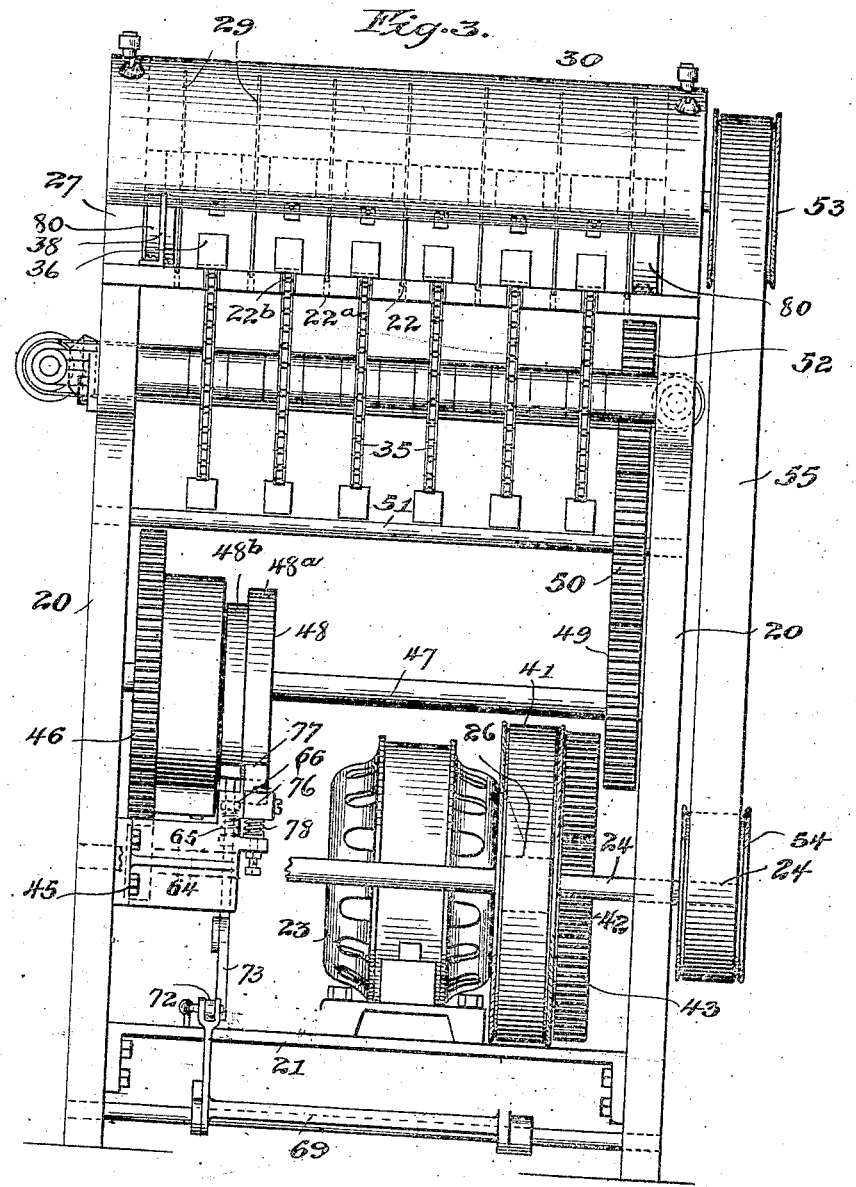

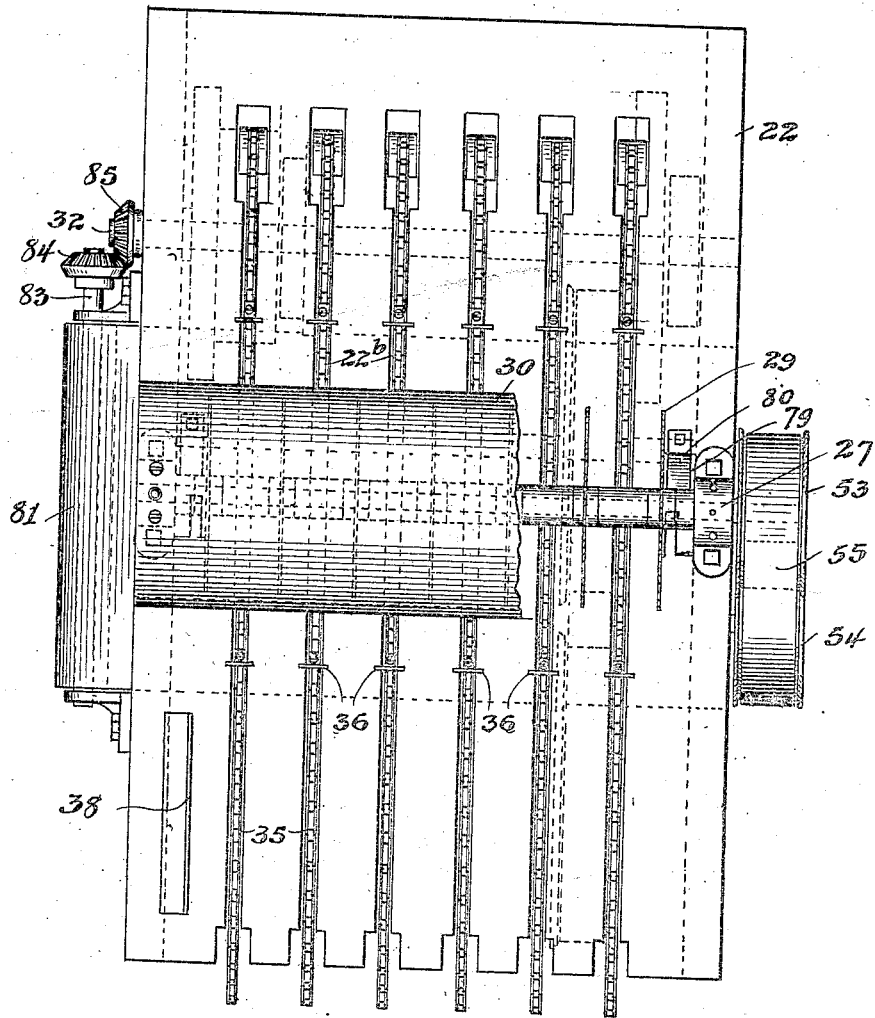

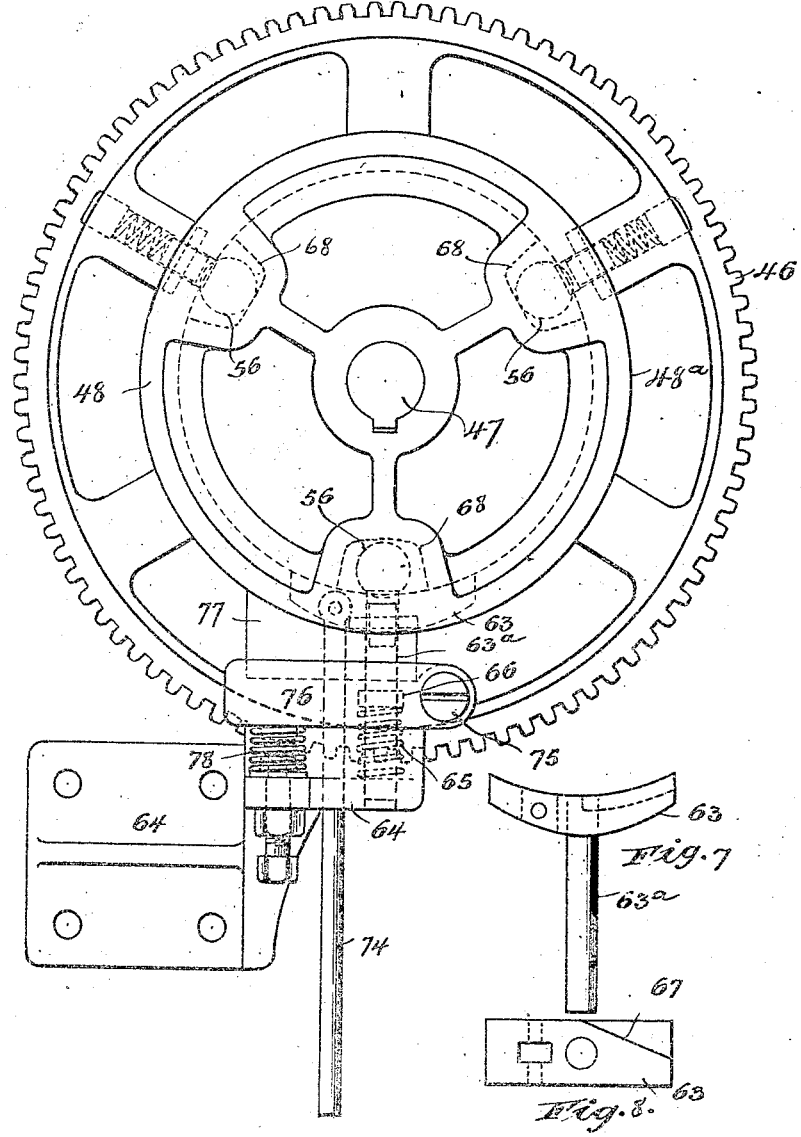

UNITED STATES PATENT OFFICE.

FRANK M. PETERS, OF CHICAGO, ILLINOIS.

WAFER-CUTTING MACHINE.

No. 908,322.   Specification of Letters Patent.   Patented Dec. 29, 1908.

Application filed November 6, 1905. Serial No. 286,137.

*To all whom it may concern:*

Be it known that I, FRANK M. PETERS, a citizen of the United States, residing at Chicago, in the county of Cook and State of Illinois, have invented certain new and useful Improvements in Wafer - Cutting Machines, of which the following is a specification.

This invention relates to machines for cutting and trimming sheets of wafers, thin crackers, and similar brittle bakery products, and dividing the sheet of material operated upon into a number of strips or forms of predetermined size.

In the manufacture of many kinds of bakery products, and especially those varieties of a delicate and brittle texture, such as sugar wafers and the like, the wafer stock is prepared in the form of relatively large sheets, which are subsequently cut and subdivided into a number of smaller strips each conforming in size and outline to the dimensions and form of the wafer to be made therefrom. On account of the delicate and fragile nature of these sheets, the proper subdivision thereof without loss of material is a matter of some difficulty, requiring careful handling and the employment of rapidly operating cutters to effect a neat and clean division of the wafer sheet without breakage and waste. To produce a machine capable of thus dividing one or more wafer sheets in an expeditious manner is the object of the present invention; and in the accompanying drawings I have illustrated the preferred mechanical embodiment of my invention, a reference to which will enable the latter to be clearly understood, both as to its construction and mode or manner of operation.

In the drawings,—Figure 1 is a side elevational view of the machine; Fig. 2 is a cross-sectional view from front to rear through the same; Fig. 3 is a front elevational view; Fig. 4 is a top plan view; Fig. 5 is a detail view in vertical section through the clutch and braking mechanism of the conveyer driving means; Fig. 6 is a front elevational view of the parts shown in Fig. 5; Fig. 7 is a top plan view of the clutch bolt controlling device; Fig. 8 is a detail side elevational view of the same; Fig. 9 is a side elevational view of the sliding clutch bolt; and Fig. 10 is a bottom plan view of the latter.

The frame of the machine comprises substantially a pair of upright side-frames 20 suitably connected and spaced apart by a lower platform 21 and a top plate 22. Rigidly bolted on the platform 21 is an electric motor 23, the armature shaft 24 of which extends beyond one of the side frame members and carries a small friction disk 26.

27 designates each of a pair of standards mounted on the side-frames 20, in and between which is journaled a shaft 28, on which is mounted a series of circular cutters 29 the peripheries whereof are formed with saw teeth, said cutters being fast on the shaft and rotatable therewith. The peripheries of the cutters at their lowest point enter and travel through a series of parallel kerfs or grooves 22$^a$ formed in the upper surface of the plate 22, as clearly shown in Fig. 3; and said series of cutters is preferably provided with a hood 30 constituting a guard. Mounted in and between the front and rear ends of the side-frames at their upper parts are a pair of shafts 31 and 32, the former carrying a series of sprockets 33 and the latter a corresponding series of sprockets 34, in alinement with the sprockets 33. Over the alined pairs of sprocket wheels are trained sprocket chains 35, the upper sections of which travel through grooves 22$^b$ formed in the upper surface of the plate 22, centrally between and alternating with the kerfs 22$^a$. Each sprocket chain has mounted thereon a series of pushers or flights 36, each flight being disposed face to face with the adjacent flight on one side and back to back with the adjacent flight on the other side, and the corresponding flights on the several chains being arranged in transverse alinement, as clearly shown in Fig. 4. Across the receiving end of the machine is mounted a hood or guard 37 which covers the sprocket chains and their flights at that end of the machine, the upper end of said guard being inclined downwardly and inwardly toward the plate 22 and constituting in part a guide for positioning the wafer sheet properly upon the chains between two adjacent series of flights. A stop plate 38 mounted on one of the side-frames 20 at the receiving end of the machine determines the proper position of the sheet transversely of the chain carrier.

The wafer-sheet carrier or conveyer thus constituted by the described series of endless chains and flights is operated by a train of gearing from the armature shaft of the motor, as follows. 39 designates a large friction wheel mounted on a cross-shaft 40 and frictionally engaged by the friction disk 26, which latter is forced into snug driving engagement with the wheel 39 by a similar idler wheel 41 on the opposite side of said friction disk. On the shaft 40 is a small spur gear 42 that meshes with and drives a large gear wheel 43 mounted on a cross-shaft 44; the latter shaft in turn carrying a small spur gear 45 that meshes with and drives a large gear wheel 46 loose on another cross-shaft 47. Splined or keyed on said shaft 47 laterally adjacent to the gear wheel 46 is a brake wheel 48; and on the same shaft 47, on the opposite side of the machine, is a smaller gear wheel 49 that meshes with and drives a similar superposed gear wheel 50 mounted on a cross shaft 51, this latter gear wheel engaging and driving a gear wheel 52 fast on the conveyer drive shaft 32.

The cutter shaft 28 is directly and continuously driven from the motor shaft 24 through the medium of pulleys 53 and 54 on said cutter and motor shafts, respectively, connected by a belt 55.

Provision is made for effecting an intermittent travel of the chain conveyer which carries the wafer-sheets through the field of action of the cutters from the continuously operating motor by means serving to alternately establish and break the continuity of the train of driving gears between the motor shaft and the driven conveyer shaft. For this purpose I have selected the automatically separating clutch mechanism next to be described, although such mechanism *per se* is old and constitutes of itself no part of the present invention.

Referring more particularly to Figs. 5 and 10, inclusive, 56 designates a clutch-bolt that is slidably mounted in a suitable bearing in the web of the large gear wheel 46, parallel with the axis of the latter, said bolt being normally pressed outwardly toward the adjacent brake disk 48 by means of a coil spring 57. The outer side or face of the operative end of said bolt has attached thereto a hardened steel wear-strip 58 provided with a transverse notch 59, for a purpose hereinafter disclosed. Pivoted at 60 in the web of gear 46 just outside of the clutch-bolt is a detent or catch 61 having a radially projecting hook $61^a$ adapted to engage the notch 59, and a longitudinally projecting lug $61^b$ through which the release of the detent is effected by means hereinafter described. The detent or catch 61 is normally pressed into engagement with the clutch-bolt by means of an adjustable coil spring 62, as clearly shown in Fig. 5. The periphery of the brake wheel 48 is formed with two radially offset peripheral surfaces, the outer of which, designated by $48^a$, forms a brake-engaging surface, while the inner, designated by $48^b$, is engaged by an arc-shaped trip-block 63, the upper face of which is formed on the arc of a circle concentric with the circle formed by the inner peripheral surface $48^b$ of the brake wheel. This trip-block 63 is suitably supported and normally pressed into engagement with the surface $48^b$ by means of a depending stem $63^a$ that is mounted and vertically slidable in a bracket 64 suitably secured to the adjacent side-frame 20 of the machine; a coil spring 65 abutting at its lower end against a portion of said bracket and at its upper end engaging a collar 66 fast on the stem $63^a$, urges the trip-block upwardly to its seat on the inner peripheral surface $48^b$ of the brake wheel. The trip-block 63 normally overlies the lug or lip $61^b$ of the detent 61, as plainly shown in Fig. 5; and the side of the trip-block 63 adjacent to the gear wheel 46 is cut away through its upper portion on an oblique line extending from the longitudinal center to one end of the block, thus forming an inclined or cam surface 67 that is engaged by the end of the wear-strip 58 of the clutch-bolt to retract the latter in a manner hereinafter described. In the side of the brake wheel adjacent to the gear wheel 46 is formed one or more recesses 68 just inside the inner peripheral surface $48^b$, said recess or recesses being adapted to be entered by the adjacent end of the clutch-bolt 56; the web of the brake wheel between said recesses being continuous and flat so as to slidingly engage the adjacent end of the clutch-bolt.

The trip-block 63 is drawn downwardly to release the catch 61 by the following mechanism. 69 (Fig. 2) designates a pedal fast on a cross-shaft 70 at the lower forward end of the machine, on which shaft is an upwardly extending arm 71 that is connected by a link 72 to one arm of a bell-crank lever 73 at the rear end of the machine, the other arm of said bell-crank lever being connected by a link 74 to the trip-block 63. From these connections it will be seen that when the operator depresses the pedal 69 by his foot, the trip-block 63 will be drawn downwardly, retracting the detent 61, and permitting the clutch-bolt 56 to snap into one of the recesses 68 in the brake wheel in case it happens to be opposite one of said recesses. If not, the end of the bolt slides along the adjacent face of the brake wheel until it comes opposite the next recess in its path, whereupon it snaps into said recess, thus imparting the rotation of the gear wheel 46 to the brake wheel, which in turn is keyed on the shaft 47, thus rendering continuous the train of driving gears between the motor and the chain conveyer.

Pivotally mounted at 75 on a portion of the bracket 64 is a brake arm 76 that carries a wooden brake block 77, the upper surface of which frictionally engages the brake surface $48^a$ of the brake wheel 48; said brake arm being normally urged upwardly by a compression spring 78 underlying its free end.

The top plate 22 of the frame has formed therethrough just outside the outer chain grooves, and approximately at the longitudinal center of said plate, a pair of oblong apertures 79, the rear end of each of which, considered with reference to the direction of travel of the wafer-stock through the machine, is provided with an upwardly inclined deflector 80 so disposed as to direct the strips and scraps trimmed off the side margins of the wafer-sheets down through said holes.

In order to catch and convey away the scrap discharged through the holes 79 as well as the dust that drops through the saw openings or kerfs 22ª, I provide an underlying transversely disposed and operating apron 81 that is mounted on rollers 82 on opposite sides of the machine frame, the shaft 83 of one of said rollers being driven from the shaft 32 of the chain conveyer by means of engaging bevel gears 84 and 85 on said shafts, respectively.

The operation of the machine has to a considerable extent been indicated above, but may be briefly described in its entirety as follows. Assuming that the parts are in the relative positions indicated in Fig. 1, with the clutch-bolt 56 retracted, as shown in Fig. 5, the motor is started in operation, and a stack of wafer-sheets is placed upon the chain conveyer between the series of flights 36 just emerging from the hood 37 and the next adjacent series of fligths nearest the cutter-disks, which latter are rotating at high speed in the direction indicated by the arrow, the stack of wafer-sheets substantially filling the space between the adjacent flights and being laterally positioned by engagement with the stationary stop-plate 38. Thereupon the operator feeding the material to the machine depresses the pedal 69, which retracts the catch 61, allowing the clutch-bolt to engage one of the recesses of the brake wheel as soon as it comes opposite said recess, whereby the travel of the chain conveyer is started up, a single revolution of the shaft 47 carrying the wafer-sheets from the front of the machine through the field of action of the cutters to the rear end of the machine where the divided and trimmed sheets are removed by another attendant, the travel of the chain conveyer being automatically stopped at this point by reason of the engagement of the end of the clutch-bolt with the inclined or cam surface 67 of the trip-block 63, whereby said clutch-bolt is retracted and held retracted by the catch 61, thereby interrupting the continuity of the chain driving connections. As soon as the operator at the feeding end of the machine has placed another stack of wafer-sheets in position upon the chain conveyer, he again depresses the pedal 69, whereupon the described operations are repeated, the travel of the chain conveyer being intermitted at regular uniform periods to permit the removal of the divided and trimmed sheets and the introduction of another stack of integral sheets into the machine. The saw-dust and marginal trimmings drop onto the transverse apron 81 underlying the cutters, the marginal trimmings being directed thereonto through the apertures 79 by the deflectors 80; and said saw-dust and trimmings are delivered into any suitable receptacle at one side of the machine, thus avoiding the clogging of the motor and operating connections by such dust and scrap.

It will be observed that the described mechanism effects a uniform intermittent travel of the wafer-sheet conveyer, the driving mechanism thereof being automatically disconnected or interrupted at regular intervals with the conveyer always in a suitable position for the removal of the stock operated upon at the discharge end of the machine and for the introduction of a fresh stack of uncut stock at the receiving end of the machine, thus avoiding the necessity of watchfulness on the part of the operator to effect the stopping of the conveyer at points suitable for the receipt and delivery of the stock.

I claim:

1. In a wafer-cutting machine, the combination with a table or platform, of an endless conveyer for the wafer stock, the carrying section of which travels over the surface of said table, a series of separated pairs of transverse flights mounted on said conveyer, between the flights of each of which pairs the wafer stock is adapted to be positioned and carried, a series of rotary cutters mounted above and transversely of said table, the lower portions of the peripheries of said cutters intersecting the plane of the carrying section of the conveyer, means for imparting a continuous rotation to said cutters, means for driving said conveyer, and means for automatically arresting the travel of the latter with the cutters between adjacent pairs of flights whereby to facilitate the removal of the cut wafer stock and the introduction of uncut stock, substantially as described.

2. In a wafer-cutting machine, the combination with a table or platform having a plurality of parallel longitudinal grooves formed in its upper surface and a plurality of parallel slots lying between and alternating with said grooves, of an endless conveyer for the wafer stock comprising a plurality of laterally spaced sprocket chains the carrying sections whereof engage said grooves of the table, a plurality of separated pairs of transverse rows of flights mounted on the chains of said conveyer, between the rows of each of which pairs the wafer stock is adapted to be positioned and carried, a cutter-shaft mounted above and transversely of said table, a series of circular cutters fast on said shaft, the peripheries whereof lie in said slots of the table, means for imparting a continuous rotation to said cutter-shaft, means for driving said conveyer, means for automatically arresting the travel of the latter with the cutters between adjacent pairs of rows of flights, and stationary guides on said table for facilitating the positioning of the uncut stock, substantially as described.

3. In a wafer-cutting machine, the combination with an endless conveyer for the wafer-stock, a cutter shaft, and a series of circular cutters mounted on said shaft, of a driving shaft, continuously operative driving connections from said driving shaft to said cutter shaft, a gear train between said driving shaft and said conveyer, an automatically disengaging clutch interposed in said gear train, and manually operable means for engaging said clutch, substantially as described.

4. In a wafer-cutting machine, the combination with a table or platform having scrap-discharging apertures formed therethrough on either side and guides adapted to direct the scrap through said apertures, of an endless conveyer the carrying section whereof overrides said table, and a scrap-discharging conveyer located beneath and operating transversely of the carrying section of said wafer-stock conveyer, substantially as described.

In testimony that I claim the foregoing as my invention, I have hereunto subscribed my name in the presence of two witnesses.

FRANK M. PETERS.

Witnesses:
 N. HASSETT,
 F. M. IRELAND.